May 24, 1949.    J. A. CALDWELL ET AL    2,471,393
ELECTRICAL CONTROL INSTRUMENT
Filed Aug. 31, 1946    2 Sheets-Sheet 1

INVENTORS.
WILLIAM H. WANNAMAKER JR.
GREGOR W. KUNTNY
JOHN A. CALDWELL
BY
E. Wallford Mason
ATTORNEY.

May 24, 1949.　　　J. A. CALDWELL ET AL　　　2,471,393
ELECTRICAL CONTROL INSTRUMENT
Filed Aug. 31, 1946　　　　　　　　　　　　2 Sheets-Sheet 2

INVENTORS.
WILLIAM H. WANNAMAKER JR.
GREGOR W. KUNTNY
JOHN A. CALDWELL
BY
ATTORNEY.

Patented May 24, 1949

2,471,393

UNITED STATES PATENT OFFICE 2,471,393

ELECTRICAL CONTROL INSTRUMENT

John A. Caldwell, Philadelphia County, William H. Wannamaker, Jr., Flourtown, and Gregor W. Kuntny, Mount Airy, Pa., assignors, by mesne assignments, to Minneapolis-Honeywell Regulator Company, Minneapolis, Minn., a corporation of Delaware Application August 31, 1946, Serial No. 694,400

12 Claims. (Cl. 201—48)

The present invention relates to control instruments, and more particularly to a means for moving one element of a control system with respect to another element thereof in response to variations in a condition under control.

In control systems using an electrical bridge network, or a so-called proportioning system, there is provided in the control instrument a resistance element. A contact is adjusted along this resistance element in response to changes in the value under measurement and control. In this case the condition is described, by way of example only, as being temperature. In response to relative movement of the contact and resistance the bridge circuit is unbalanced and a relay is operated in one direction or an opposite direction to energize a motor connected to a condition regulating device. As this motor rotates it also relatively adjusts a second contact relative to a second resistance to rebalance the electrical network.

The construction of the present invention is adapted to be used with various types of measuring instruments, but is particularly adapted for use with self-balancing potentiometers, and will be described in connection with an instrument of that type. As is well known, potentiometric instruments are provided with a part that is moved to positions corresponding to the value of the temperature under measurement and control. This part is connected mechanically in this case to the contact of the bridge circuit so that as the part is moved the contact is moved over the resistance. Provision is also made to shift the normal position of the resistance and contact relative to a given position of the part so that the bridge network is balanced at various positions of the part. In this way the control point of the instrument is changed so that the temperature under control may be maintained at different values.

It is an object of the invention to provide an accurate and easily adjustable control mechanism to be used in connection with a measuring instrument. It is a further object of the invention to provide a novel arrangement of parts by means of which a contact may be moved relative to a resistance in an electrical control circuit.

It is a further object of the invention to provide a novel arrangement of parts by means of which a contact and resistance forming part of an electrical control system may be mounted on a control instrument. By means of this arrangement the parts are so mounted that there is no lost motion between them and so that they may be easily adjusted relative to each other and relative to the instrument.

Attention is called to the copending application of Donald P. Eckman and James H. Keegan, Serial Number 694,404, and filed on August 31, 1946, that is related to the same subject matter as the present invention. The said copending application discloses a construction that is used in the same combination as the present invention, but shows a construction that is specifically different from that disclosed herein.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Figure 1:
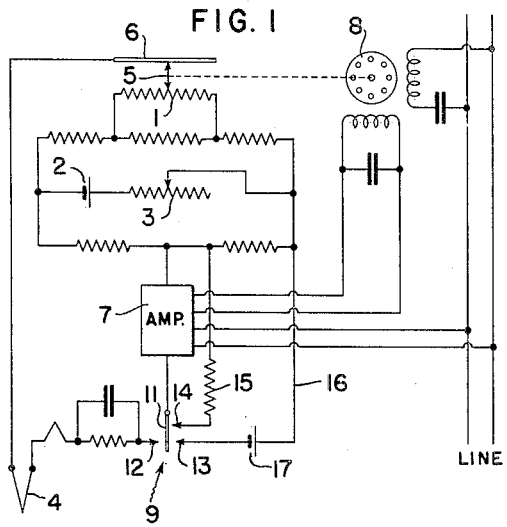
Figure 1 is a wiring diagram of a potentiometer circuit.

In Figure 1 there is shown a typical potentiometer circuit in which there is a slide-wire 1 that has a potential impressed across it by a battery 2 to produce a predetermined voltage drop; the battery preferably being in the form of a dry cell. Connected in circuit with the battery is a variable resistance 3 that is used to maintain constant the potential drop in the circuit as the battery diminishes in power in order to maintain the system in calibration. The voltage from a thermocouple 4 is impressed across a portion of the slide-wire 1 as determined by the position of a contact 5 between the slide-wire 1 and a parallel collector bar 6. As the thermocouple E. M. F. changes, due to a temperature change, the potentiometer circuit becomes unbalanced and this in turn is detected by a vibrator and amplifier unit 7 to energize a motor 8 to shift the contact 5 along the slidewire in the proper direction and amount in order to rebalance the potentiometer circuit. The details of the vibrator and amplifier are disclosed in the copending application of Walter P. Wills, Serial No. 421,173, which was filed on December 1, 1941, and which issued as Patent No. 2,423,540 on July 8, 1947.

The thermocouple is normally connected in the circuit by means of a switch 9 which consists of a movable contact 11 that is directly connected to the amplifier and a stationary contact 12 that is connected to the thermocouple. This switch is also provided with stationary contact 13 that is connected to the potentiometer network, and a stationary contact 14, that is used to insert a shunt resistance 15 around the amplifier at such times as the potentiometer circuit is being standardized. In the wire 16 between the contact 13 and the potentiometer network there is located a standard cell 17 which is used to impress a standard potential drop across a portion of the potentiometer network at such times as the network is being recalibrated or standardized.

In the operation of a potentiometer network of the type disclosed above, upon the occurrence of a change in temperature of a thermocouple 4 the potentiometer circuit will be unbalanced to produce a current flow in one direction or the other through the vibrator which is included along with the amplifier and designated as 7. The vibrator and amplifier will detect this unbalance, its direction and amount, and correspondingly energize the motor 8 for rotation in the proper direction. This motor is mechanically connected, in a manner to be described, with the contact 5 so that the latter is shifted along the slide-wire 1 and collector 6 to a position in which the potentiometer circuit is again rebalanced and no current flows through the unit 7.

Due to the fact that the strength of the battery 2 gradually diminishes with use it becomes necessary to adjust the resistance 3 from time to time in order to maintain the calibration of the instrument. At such times as the instrument is to be recalibrated or standardized the movable contact 11 of the switch 9 is shifted to the right to disconnect the thermocouple from the circuit and to insert the standard cell 17 across a portion thereof and to simultaneously insert the shunt 15 around the unit 7. If the circuit needs recalibration a current flow will be produced, producing an energization of the motor 8 to rotate this motor in a direction and an amount proportional to the potentiometer unbalance at that time. This rotation of the motor is used to adjust the amount of the resistance 3 which is inserted in the circuit.

Figure 2:
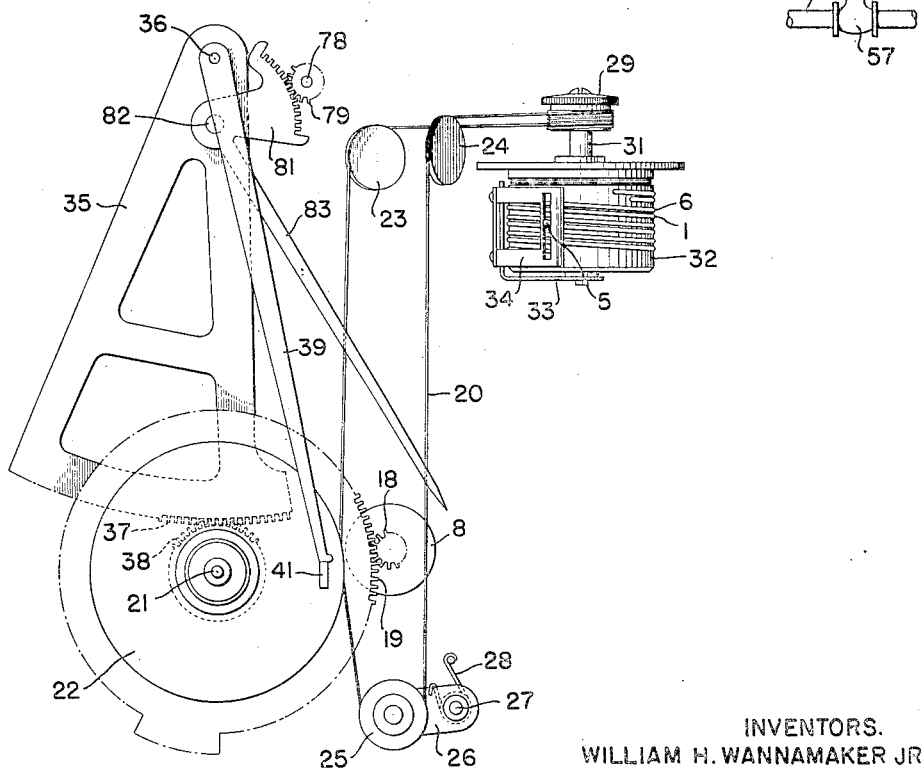
Figure 2 is a diagrammatic view of the construction of various parts of a potentiometer.

Referring now to Figure 2 it will be seen that motor 8 is provided with a pinion 18 that meshes with a gear 19 which is attached to a shaft 21. As the motor rotates, the gear and shaft will also be rotated to turn a driving pulley 22 which is attached to the shaft 21. A portion of a cable 20 is wrapped around this driving pulley and passes over additional pulleys 23, 24, and 25, the latter of which is mounted on a lever 26 that is pivoted at 27 and biased in a clockwise direction by a spring 28 in order to take up any slack that may appear in the cable. The ends of the cable are wrapped around and attached to a driven pulley 29 that is mounted on a shaft 31 which is journaled for rotation in a ceramic or other insulating support 32. This support has wrapped around it in parallel helical relation the slidewire 1 and the collector 6.

A support for the contact 5 is mounted on the lower end of shaft 31 and consists of an angle member 33 which extends beyond the edge of support 32 and upwardly parallel to the side of the same. This member has attached to it a spring 34 that is provided with a slot in which contact 5 is located. Therefore, it will be seen that as the motor 8 rotates it serves, through the cable 20, to drive pulley 29 and support 33, 34 to move contact 5 around the outer edge of the support 33. The contact is held by part 34 in engagement with the slidewire and collector so that as it rotates more or less of the slidewire is inserted in the thermocouple circuit to rebalance the potentiometer as the thermocouple changes in temperature.

Motor 8 also serves to drive a pen which will make a record of the value of the temperature of the thermocouple as the motor rotates. To this end there is provided a sector member 35 that is attached to a shaft 36. This sector member has gear teeth 37 formed on its lower surface which teeth mesh with a pinion 38 that is also attached to shaft 21 and which pinion serves to drive the sector as the pinion is rotated. Pen arm 39, which carries on its lower end a pen 41, is attached to shaft 36 to move with the sector as the latter is driven by the motor 8. The pen 41 is adapted to make a record on a chart (not shown) of the value of the temperature.

Figure 3:
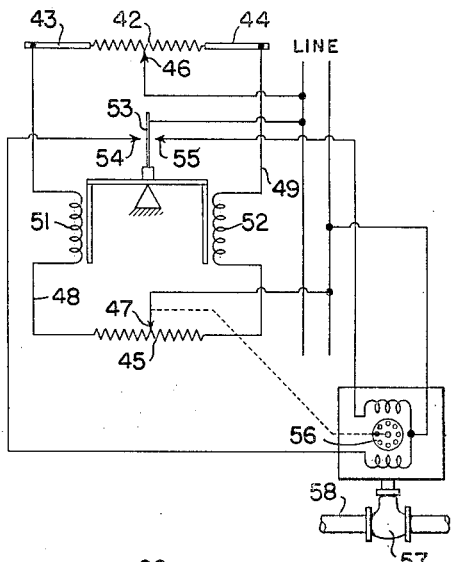
Figure 3 is a wiring diagram of a simple proportioning control system.

It may be assumed that the thermocouple 4 is responsive to the temperature of a heater, the value of which temperature is to be controlled by the potentiometer instrument. To this end, movement of the pen arm shaft 36 in response to changes in temperature is used to adjust a movable element of an electrical bridge circuit of the type known as a proportioning system. Such a system is shown diagrammatically in Figure 3.

The bridge circuit has a resistance 42 each end of which is connected electrically with a contact 43 or 44. This resistance is connected by wires 48 and 49 respectively with a second resistance 45 to complete the bridge. Energizing current is supplied to this bridge from one side of the line by means of a contact 46 that is movable over the resistance 42 and the contacts at its end, and from the other side of the line from a contact 47 that is movable over the resistance 45. Normally speaking the resistance 42 and its contact 46 are located in the instrument, whereas, the resistance 45 and its contact 47 are located at a remote point and preferably in the structure of the valve that is to be adjusted in response to temperature changes. Located in the connecting wires 48 and 49 respectively are coils 51 and 52 of a relay mechanism. As one or the other of these coils is energized to a larger extent than the other due to movement of contact 46, the relay will move a contact 53 into engagement with either a contact 54 or a contact 55. These contacts are connected to opposite fields of a reversible motor 56 that is geared in a suitable fashion to a valve 57 that is located in a pipe 58 through which a heat changing medium is supplied. The motor is energized by having another line extend from a junction of the two fields, as is diagrammatically shown, to one side of the line and from the other side of the line through a connection with contact 53.

In the operation of a bridge circuit of this type, if the bridge is balanced the relay coils 51 and 52 will be equally energized so that contact 53 does not engage either of the contacts 54 or 55. Upon a movement of contact 46 along resistance 42 in one direction or the other, the bridge will be unbalanced to cause one of the coils 51 or 52 to be energized more than the other. Such operation moves contact 53 into engagement with one or the other of contact 54 or 55 to energize one field of motor 56. The motor will therefore rotate to adjust valve 57 in a direction to correct the flow of temperature changing fluid in pipe 58. Simultaneously motor 56 will move contact 47 along resistance 45 in a direction to rebalance the bridge circuit. When the bridge is rebalanced coils 51 and 52 will again be equally energized and the circuit for motor 56 will be broken. The parts will stay in this position until such time as another change in temperature takes place.

Figure 4:
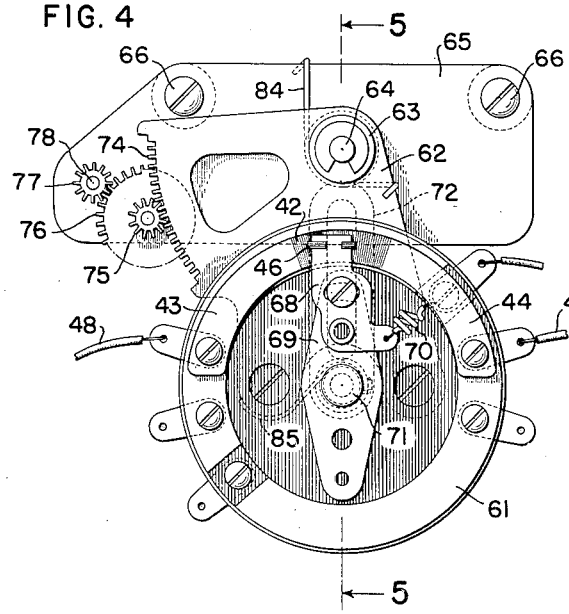
Figure 4 is a front view of one form of a control mechanism.
Figure 5:
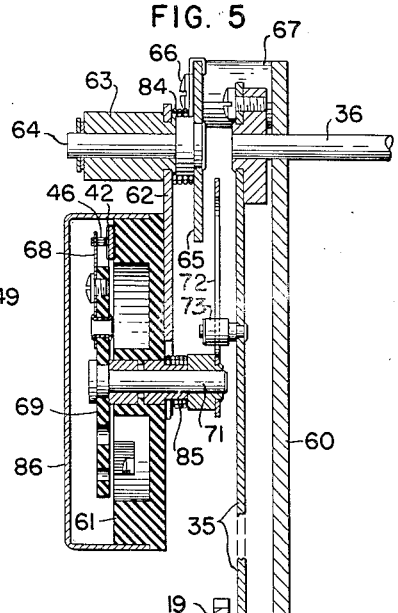
Figure 5 is a view taken on line 5—5 of Figure 4.

The means for mounting and moving resistor 42 and contact 46, to which the invention is particularly directed, is shown in one form in Figures 4 and 5 and will now be described. In this case resistance 42 takes the form of an arcuate strip of carbon while contacts 43 and 44 consist of a thin coating of silver on the opposite ends of the carbon strip. The resistance of the carbon is fairly large while the resistance of the silver strips is negligible so that the length of the resistance is determined by the position of the silver portions 43 and 44 on the carbon member. The arcuate strip upon which the contacts and resistance are formed is suitably mounted on a disc 61 of insulating material which has a circular raised edge, as is best shown in Figure 5 of the drawing. This disc is attached to a supporting plate 62 that has a journal 63 rigidly attached to its upper end. The journal is received on a stud shaft 64 which projects from the surface of a stationary plate 65. The plate is fastened to the instrument frame 60 with shaft 64 coaxial with shaft 36 by means of screws 66, and is spaced the proper distance from the frame by lugs 67 through which the screws extend as is best shown in Figure 5 of the drawing. Contact 46 in this case takes the form of a series of resilient wires that are mounted on a conducting support 68 and which wires are biased into engagement with the resistance. Support 68 is adjustably attached to an arm 69 that is made of some insulating material. This arm is mounted upon a shaft 71 that is journaled in the center of disc 61. Shaft 71 is rotated by engagement between a slotted lever 72 that is attached thereto, and a roller 75 that is mounted on a stud projecting from segment 35. Terminals are provided for the ends of contacts 43 and 44 and for contact 46 as is best shown in Figure 4. These terminals are fastened to disc 61 and project from its periphery as shown. Contact 46 is connected to its terminal by a flexible wire 70.

From the above description it will be seen that as sector 35 is rotated with the pen shaft due to unbalance of the potentiometer, roller 73 will act on lever 72 to move this lever and its supporting shaft and thereby move contact 46 along resistance 42. The parts are so arranged that when the temperature is at the desired value contact 46 will be in the center of the resistance 42. At this time shaft 71, contact 46, roller 73 and pen shaft 76, will all fall in a single plane, or looking at Figure 4, each of these parts will be in a straight line. As the temperature under measurement changes from this desired value, the contact will be moved to one side of its center position on the resistance to unbalance the bridge circuit and thereby cause an adjustment of the control valve.

One of the features of this form of the invention is the use of a resistance made of an arcuate strip of carbon. Because of the smooth surface of the carbon resistor very little power is required to move the contact 46 along it.

In a control instrument it is necessary to be able to control the temperature at any value in the range of the instrument, or to change its control point. This adjustment is accomplished in the present instrument by moving plate 62 and the parts carried thereby bodily around shaft 64. As this is done roller 73 will act on lever 72 to move contact 46 relative to resistance 42. The contact can then be brought back to the center of the resistance only by a movement of sector 35 in response to a change in temperature in the proper direction. The parts will again line up when the temperature has reached the new value for which plate 62 has been set. In order to adjust easily plate 62, the plate is provided on its left edge, as is shown in Figure 4, with a set of gear teeth 74 that mesh with a pinion 75. The pinion is connected to a gear 76 that in turn meshes with a pinion 77 on the end of a shaft 78 which is journaled for rotation in supporting plate 65 and the instrument frame 60. This shaft extends through the frame and is provided on its front end with an adjusting knob (not shown) by means of which it may be rotated to change the position of plate 62 and the parts carried thereby. To indicate the control point of the instrument there is provided adjacent the front of the instrument on shaft 78 a pinion 79 that engages with teeth formed on the right edge of a sector 81, as is shown in Figure 2. This sector is pivoted at 82 and is provided with extension 83 which forms an index that is intended to extend across the front of the chart with which pen 41 cooperates. In adjusting the control point of the instrument, shaft 78 is rotated. This rotation acts through the gears, shown in Figure 4, to adjust plate 62 and the parts carried thereby around shaft 64. Simultaneously segment 81 and index 83 are adjusted across the front of the chart until the end of the index cooperates with the calibration marks on the chart in a conventional manner to indicate the temperature which the instrument is intended to maintain. Therefore by merely rotating shaft 78 and watching index 83, an operator can determine exactly what temperature the instrument will tend to maintain.

In order to maintain close control it is necessary that there will be no play in the various parts. To this end any back lash that may occur in the control point adjusting gearing is taken up by a spring 84 one end of which engages the plate 62 and the other end of which engages supporting plate 65 to tend to bias plate 62 and the parts carried thereby in a clockwise direction as shown in Figure 4. There is also provided a spring 85 one end of which engages plate 62 and the other end of which engages arm 72 to bias this arm in a counterclockwise direction in Figure 4. The purpose of this is to insure that roller 73 will always engage the same side of the slot in lever 72. Thus this slot may be made large enough so that the roller will not bind in the slot. The arrangement of roller 73 and lever arm 72 is such that the greatest movement of the arm for a given movement of the roller is obtained when the temperature is at the control point. Thus the instrument is most sensitive when it is controlling the temperature at or near the desired value.

From the above description it will be seen that by adjusting the various parts, contact 46 may be brought to the middle portion of resistance 42 at any value within the range of the instrument. Thereafter whenever the temperature deviates from this value the bridge circuit will be unbalanced to cause an adjustment of the control valve in proportion to the amount which the temperature has deviated. Such adjustments change the amount of heating medium going to the space whose temperature is under control to bring this temperature back to the desired value and contact 46 back to the center of resistance 42.

Figure 6:
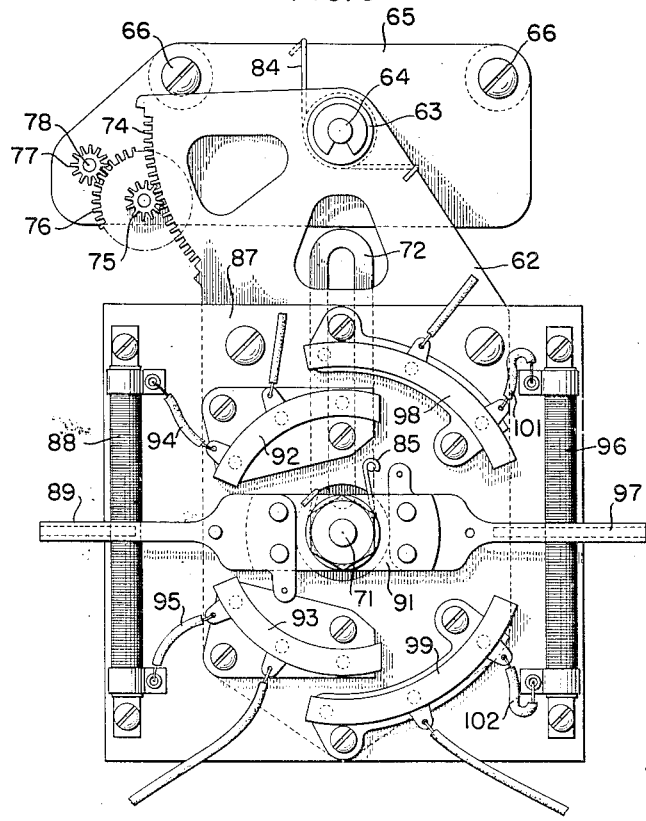
Figure 6 is a front view of a different arrangement of the control mechanism.

In Figure 6 there is shown another form of the invention in which a wound resistance and separate contacts are used in place of the carbon resistance 42 and the silver contacts 43 and 44 on the end thereof, as is shown in Figures 4 and 5. Also in Figure 6 there are provided two contacts and two resistances which are operated by the same mechanism so that more than one control valve may be adjusted in response to changes in the temperature if it is so desired.

Referring to the drawing it will be seen that supporting plate 62 has attached to the front of it a rectangular plate 87 that is preferably made of some insulating material such as a sheet of Bakelite. Shaft 71 is journaled for rotation in this plate, as it was in the previously described embodiment of the invention. Attached to one side of plate 87 and extending vertically along the edge thereof is a wound resistance 88 that may be comprised of a wire of suitable diameter which is wound on a core, the latter of which is attached as shown to plate 87. Cooperating with this resistance, and sliding therealong, is a contact 89 that is mounted on a supporting arm 91 of insulating material. This arm is fastened to shaft 71 by means of a nut and may be adjusted angularly with respect to this shaft if the nut is loosened. Also mounted on plate 87 and adjacent the ends of resistance 88 are a pair of contacts 92 and 93 that are connected with the ends of resistance 88 by wires 94 and 95 respectively. It will be seen from the drawing that as shaft 71 is rotated contact 89 will be moved along the resistance from one end to the other end. At some point during this movement the contact will move into engagement with either of the terminal contacts 92 or 93. These contacts can be so positioned on plate 87 that the amount of resistance 88 included in the circuit can be varied. Therefore, the angular movement of shaft 71 and contact 89 that is obtained before the end of the resistance is reached can be varied. This in effect is an adjustment of the instrument's throttling range.

On the opposite side of plate 87 is another resistance 96 that is mounted in the same manner as resistance 88. This resistance is engaged by a contact 97 that is also attached to arm 91. Located adjacent the ends of resistance 96 and attached to the plate 87 are contacts 98 and 99 that are connected electrically to the ends of resistance 96 by means of wires 101 and 102. Contacts 98 and 99 may also be adjusted to determine the length of resistance 96 that is engaged by contact 97 before this contact reaches one of the terminal contacts 98 or 99. Thus, it will be seen that rotation of shaft 71 will, in this case, serve to control the operation of a plurality of electrical proportioning systems so that the instrument may be used to adjust a plurality of control valves.

It is intended that shaft 71 be rotated by a slotted arm 72 and that this arm be acted upon by a roller 73 projecting from sector 35, as was the case in Figures 4 and 5. Thus, contacts 89 and 97 are rotated in response to variations in the temperature under measurement in exactly the same fashion as contact 46 is rotated with respect to resistance 42. In this case also back lash between the various parts is taken up by a spring 84 that biases plate 62 in a clockwise direction, and a spring 85 that biases shaft 71 in a counter-clockwise direction.

It is noted that a second resistance and contact may be added to plate 61 and arm 69 respectively in the embodiment of Figures 4 and 5 if it is so desired. In such a case the embodiment of Figures 4 and 5 can also be used to adjust more than one control valve.

From the above description it will be seen that we have provided an electrical control apparatus which is designed particularly to be used in connection with a potentiometer type of instrument. The mechanism is easily assembled and may be accurately adjusted so that the instrument will operate the control valve in accordance with deviations of the temperature under measurement from any desired point within the range of the instrument. The parts are so designed that the control point of the instrument may be changed easily and with a minimum of trouble by an operator who is in charge of the process under control. In addition the instrument mechanism itself is provided with enough adjustments so that it may accurately be positioned to take care of practically any type of control application to which a system of the type under consideration is adapted.

While in accordance with the provisions of the statutes, we have illustrated and described the best forms of our invention now known to us, it will be apparent to those skilled in the art that changes may be made in the form of the apparatus disclosed without departing from the spirit of our invention as set forth in the appended claims, and that in some cases certain features of the invention may sometimes be used to advantage without a corresponding use of other features.

Having now described our invention, what we claim as new and desire to secure by Letters Patent is as follows:

1. In a control instrument, a frame, a supporting plate pivoted to said frame, a resistance carried by said plate, a shaft pivoted in said plate, a contact carried by said shaft and engaging said resistance, a part movable in response to variations in a measurable condition, connecting means between said part and said shaft whereby said shaft is rotated as said part moves, and means to move said supporting plate and the elements carried thereby relative to said part.

2. In a control instrument, a pivoted part, means to move said part around its pivot to positions dependent upon the value of a measurable condition, a supporting plate mounted for pivotal movement coaxial with said part, means to move said supporting plate to positions corresponding with a desired value of said measurable condition, a resistance element mounted on said supporting plate, a contact pivoted in said supporting plate for movement along said resistance, and connecting means between said contact and part whereby relative movement of said part and said plate will move said contact along said resistance.

3. In a control instrument, a stationary frame, a part pivoted to said frame, means to move said part around its pivot to positions corresponding to the value of a measurable condition, a member mounted on said frame, a supporting plate, means to mount pivotally said plate on said member coaxial with the pivot of said part, a resistance element on said plate, a contact on said plate adjacent each end of said resistance and electrically connected thereto, a movable contact, means to mount said movable contact for pivotal movement on said plate whereby it may be moved from engagement with one of said first mentioned contacts along said resistance to the other of said first mentioned contacts, means to rotate said movable contact by movements of said part, and means to move said supporting plate to different positions around its pivot.

4. In a control instrument, a stationary frame, a supporting plate carried by said frame and mounted for pivotal movement, a resistance element mounted on said plate, a shaft journaled for rotation in said plate, a contact element mounted on said shaft and operative to move across said resistance element as said shaft is rotated, a part pivoted in said frame concentric with said supporting plate, means to move said part around its pivot to positions corresponding to the value of a measurable condition, connecting means between said part and said shaft whereby the shaft is rotated as said part is moved, and means to move said supporting plate around its pivot.

5. In a control instrument, a supporting plate, a resistance mounted on said plate, a contact to engage and move across said resistance, means to mount said contact for pivotal movement on said plate, an arm extending from said mounting means, a part, means to mount said part for pivotal movement through a plane perpendicular to said mounting means, cooperating means between said arm and part whereby movement of the latter moves said arm, means to move said part to positions corresponding to the values of a variable condition, and means to move said supporting plate to positions corresponding to desired values of said condition.

6. In a control instrument, a supporting plate, means to move said plate around an axis to positions corresponding to the desired value of a variable condition, an elongated resistance mounted on said plate, a contact mounted on said plate adjacent each end of said resistance and electrically connected thereto, a shaft journaled for rotation in said plate, a contact element on said shaft and operative to move from engagement with one of said first mentioned contacts along said resistance into engagement with the other of said first mentioned contacts as said shaft rotates, a part mounted to move around a pivot coaxial with the pivot of said plate, means to move said part to positions corresponding to the value of said variable condition, and connecting means between said part and said shaft to rotate the latter as said part is moved.

7. In a control instrument, a part, means to pivot said part around an axis to positions corresponding to the value of a measurable condition, a supporting plate pivoted for movement around an axis coaxial with that of said part, means to move said plate to positions corresponding to the desired value of a condition, a member mounted for rotation on said plate around an axis parallel to that of said part and said plate, an arm extending radially from said member, a pin extending from said plate at a point displaced from said member and engaging said arm whereby relative movement of said part and plate will cause rotation of said member, a control part on said plate, and a cooperating control part on said member, said control parts moving relative to each other as said part or said plate is moved.

8. In a control instrument, a supporting plate, means to mount said plate for movement around a pivot, means to move said plate to positions corresponding to the desired value of a variable condition, a pair of elongated resistance elements mounted at spaced apart points on said plate, a limiting contact mounted on said plate adjacent each end of each of said resistances, electrical connections between the ends of said resistances and the adjacent contact, an arm, means to mount said arm for rotation on said plate at a point between said resistances, a pair of movable contacts mounted on said arm and extending therefrom in opposite directions, said movable contacts being adapted to move respectively over one of said resistances and adjacent ones of said first mentioned contacts, and means to rotate said arm to positions corresponding to the value of said condition to adjust said movable contacts along said resistances, the position of said movable contacts for a given value of said condition depending upon the position of said supporting plate.

9. In a control instrument, a part movable around a pivot, means to move said part to various positions depending upon the value of a variable condition, a supporting plate, means to mount said supporting plate for movement around a pivot coaxial with the pivot of said plate, means to move said supporting plate to various positions corresponding to the desired value of said condition, a first control element mounted on said plate, a second control element cooperating with said first control element, means to mount said second control element for rotation in said plate around an axis parallel to the pivot of said plate and said part, cooperating means extending between said second control element and said part whereby the former is moved by the latter, said element having given relative positions when the condition is at a value corresponding to the value for which said plate is positioned, and moving out of said relative positions as said condition varies from said value.

10. In a control instrument, the combination of a part mounted for pivotal movement around an axis to positions corresponding to the value of a variable condition, a supporting plate, means to mount said supporting plate for movement around an axis coaxial with that of said part, means to move said supporting plate to positions corresponding to the value at which it is desired to maintain said condition, a resistance element carried by said supporting plate, a contact to engage and move along said resistance, and cooperating means carried by said supporting plate and said part to move said contact upon relative movement of said supporting plate and said part.

11. In a control instrument, a part movable to positions varying in accordance with the value of a condition, a supporting plate, a resistance formed of a smooth arcuate strip of carbon, means to fasten said resistance to said supporting plate, a contact mounted in said supporting plate for movement around an axis concentric with the arc of said resistance, and cooperating means extending between said contact and said part to move said contact along said resistance as said part is moved in response to variations in the value of said condition.

12. In a control instrument, the combination of a part mounted for movement in accordance with variations in the value of a condition, a supporting plate, an arcuate resistance element having a smooth surface attached to said plate, a contact mounted for pivotal movement in said plate in a position for said contact to move along said resistance as said contact is moved around its pivot, an arm attached for movement with said contact and extending radially of the pivot, said arm having a slot therein, a roller projecting from said part into said slot whereby as said part is moved cooperation between said roller and slot will move said contact along the smooth surface of said resistance.

JOHN A. CALDWELL.
  WILLIAM H. WANNAMAKER, Jr.
  GREGOR W. KUNTNY.

REFERENCES CITED

The following references are of record in the file of this patent:

UNITED STATES PATENTS

| Number | Name | Date |
|---|---|---|
| 1,821,273 | Pike | Sept. 1, 1931 |